United States Patent [19]
Barton et al.

[11] 3,978,452
[45] Aug. 31, 1976

[54] SYSTEM AND METHOD FOR CONCURRENT AND PIPELINE PROCESSING EMPLOYING A DATA DRIVEN NETWORK

[75] Inventors: Robert Stanley Barton, Palo Alto, Calif.; Alan Lynn Davis, Salt Lake City, Utah; Erwin Arthur Hauck, Arcadia, Calif.; Don Martin Lyle; Lloyd Drayton Turner, both of Huntington Beach, Calif.

[73] Assignee: Burroughs Corporation, Detroit, Mich.

[22] Filed: Feb. 28, 1974

[21] Appl. No.: 447,040

[52] U.S. Cl. .............................................. 340/172.5
[51] Int. Cl.² .......................................... G06F 3/00
[58] Field of Search ...................... 340/172.5; 445/1

[56] References Cited
UNITED STATES PATENTS

| | | | |
|---|---|---|---|
| 3,047,228 | 7/1962 | Bauer et al. | 340/172.5 |
| 3,287,703 | 11/1966 | Slotnick | 340/172.5 |
| 3,308,436 | 3/1967 | Borck, Jr. et al. | 340/172.5 |
| 3,383,661 | 5/1968 | Goldstein | 340/172.5 |
| 3,473,160 | 10/1969 | Wahlstrom | 340/172.5 |
| 3,614,745 | 10/1971 | Podvin et al. | 340/172.5 |
| 3,646,523 | 2/1972 | Berkling | 340/172.5 |
| 3,657,736 | 4/1972 | Boom et al. | 340/172.5 |

*Primary Examiner*—Harvey E. Springborn
*Attorney, Agent, or Firm*—Mervyn L. Young

[57] ABSTRACT

This disclosure is directed toward a data driven network of uniform processing or function modules and local storage units which network may be readily partitioned to accommodate various concurrent operations or tasks. Data transfer is serial in nature so that data segments can be of any length. Execution by each function module is initiated by arrival of all of the required data structures, one of which contains an operator and may be stored in the associated local storage unit. The other data structure may contain operands and modifiers. Thus, a series of such operators may be distributed throughout the network to increase processing performance and throughput. A particular character set and data structure format is also disclosed.

10 Claims, 12 Drawing Figures

| CHAR. | $b_1$ | $b_2$ |
|---|---|---|
| ( | 1 | 0 |
| 0 | 0 | 0 |
| 1 | 1 | 1 |
| ) | 0 | 1 |

(( )5(COND.)C(    )7( )MS0( )MS1( )...MSN( ))

(( )0( )1( )AQ(N)7(A))

SYSTEM AND METHOD FOR CONCURRENT AND PIPELINE PROCESSING EMPLOYING A DATA DRIVEN NETWORK

RELATED U.S. PATENT APPLICATIONS

U.S. patent applications directly or indirectly related to the subject application are the following:

Ser. No. 447,016 filed Feb. 28, 1974 by R. S. Barton et al and titled Data Driven Digital Data Processor;

Ser. No. 447034 filed Feb. 28, 1974 by R. S. Barton et al and titled Nested Data Structures For A Data Driven Digital Data Processor;

Ser. No. 447,015 filed Feb. 28, 1974 by R. S. Barton et al and titled Vocabulary And Error Checking Scheme For A Character-Serial Data Digital Processor, now U.S. Pat. No. 3,886,522; and Ser. No. 447,017 filed Feb. 28, 1974 by R. S. Barton et al and titled Data Processing System.

BACKGROUND OF THE INVENTION

1. Field of the Invention

This invention relates to a data driven network for concurrent and pipeline processing and more specifically to such a network including both distributed processing elements and also distributed memory elements.

2. Description of Prior Art

Prior art data processing systems have generally been designed with a high degree of centralization of system control which resided in such devices as the central processor and main memory units. This high degree of centralization resulted from hardware costs, component sizes and attempts to optimize the utilization of such components. In turn, system operational algorithms were oriented toward centralized as opposed to decentralized control and algorithms and languages were oriented toward sequential task execution. In such centralized systems, particular devices were dedicated to particular functions and partitioning of the system between different processes was, at best, irregular. Large operating systems were evolved in order to optimize the utilization of the various system components or devices in order to share them across a number of programs and tasks. Such highly centralized systems do not take full advantage of the economies now available with the use of modular large scale integrated (LSI) circuit chips.

In order to provide more flexibility for the accommodation of concurrent processes, programs, and tasks, such centralized prior art systems have evolved into multiprocessing and also parallel processing systems made up of networks and arrays of units that achieve some degree of modularity. That is to say, the processing capabilities can be increased by adding additional central processing units, main memory can be increased by adding an additional number of memory modules and the I/O capabilities can be increased by adding an additional number of I/O channels or control units. However, the individual processing units and I/O control units are still oriented toward sequential task execution, system control is still relatively centralized, and partitioning of the different units in the system to handle different concurrent tasks is still relatively irregular.

Developments in LSI circuitry and in other component technology have removed some of the influences which resulted in the design of a highly centralized control in computer systems. LSI technology requires regularity and nondedication of specialized or complex algorithms and functions to circuit chips. Additionally, integrated circuit memories are interface compatible with logic circuits and, therefore, the register oriented processor architecture may be eliminated by distributing integrated circuit memories throughout the system. In addition, the development trends in periodic storage devices such as discs, disc packs, delay lines, and the like, have provided a very inexpensive form of memory. While the access times of such periodic or dynamic type memories are relatively slow compared to integrated circuit memories, the distribution of such periodic memories throughout a system allows the advantage of a virtually infinite amount of storage for which the access time is no greater than the access time for a particular memory.

In order to provide modularity of units implemented in integrated circuits, the employment of microprogramming allows the system to be fabricated from a large number of similar processor chips, each of which is dedicated to a particular task by the microprogram stored in its microprogram memory. Thus, a number of similar processors implemented in integrated circuit chips can be respectively dedicated to arithmetic operations, input/output operations, and the like.

A particular architectural feature which has influenced the design of highly centralized systems has been the employment of bit parallel data paths and the bit parallel access of memory. Such parallel data transfer has required some uniform width of data segments which, in turn, does not readily accommodate different user applications. However, the employment of a serial-by-bit or serial-by-character data transfer readily accommodates data segments of any length and avoids the requirements that data paths, registers and memory locations be wired in uniformity with one another.

Perhaps the most significant single feature of prior art systems, which has resulted in the design of centralized system control and sequential task execution, has been that of employing control driven instruction execution. That is to say, in most prior art systems, a string of instructions representing a program, or procedure within a program, have been called forth by the sequential incrementation of a program counter and the operands required by the instruction string must be arranged to arrive at the processor in time for the execution of the particular instructions in that string. Since the presence of the necessary operands has not been the event calling for instruction execution, a number of cumbersome methods has been created for insuring the presence of the necessary operands.

In contrast with such control driven systems, data driven systems are ones where the particular instructions are called forth for execution in response to the arrival of the respective data segments at a particular processing unit. In such data driven systems, a program counter is not required for system control and there is no longer any necessity for centralization of such system control. In such a data driven system, the various instructions making up a program can be assigned to different processors and the execution thereof would take place in sequence as the respective data was transferred from one processor to another. In this manner, the system can be readily partitioned to accommodate completely concurrent or unrelated procedures. On the other hand, where a number of processing actions are to be executed on like data segments, the stream of such like data segments can be transferred from one processor to another to provide a pipeline effect limited only by the transfer rates from one processor to another.

It is, then, an object of the present invention to provide an information processing system with a more natural organization for operation than exists in prior art control driven systems.

It is another object of the present invention to provide an information processing system having distribution of function units and memory units which system does not require centralized system control.

It is still another object of the present invention to provide an improved information processing system that may be dynamically partitioned to accommodate concurrent procedures, programs, and tasks.

It is still another object of the present invention to provide an improved information processing system comprising any number of similar function units that then may be assigned different tasks that are to be performed by the system.

It is a further object of the present invention to provide an improved information processing system having a distributive memory that can be increased without limit without an increase in the access time thereof.

SUMMARY OF THE INVENTION

In order to accommodate the above described objects, the present invention is directed toward a network of processing or function modules each of which is provided with its own local storage, the main memory storage function being provided by the plurality of different local storages. Data transfer between various function modules is asynchronous in a character serial manner. Execution by each of the function modules is initiated by arrival of all of the data items required by one of the nodes, of a program network (or net), contained in the local storage unit coupled to that function module. The respective required data items form associated data structures. One of these data structures is an instruction or operator (operand) node and a plurality of such nodes are stored in one or more of the different local storages to form a program network. The other data structure includes transient data items which provide connection between the nodes of the program net. The transient data items include at least one operand (operator) and an address pointing to the location in a local storage of the instruction or operator (operand) node to be executed. Both monadic and dyadic operation nodes are accommodated. The operator nodes are provided with a destination address to which the results of the operation are to be transmitted. The function module is, then, data driven and there is no need for a large operating system to provide task scheduling and interrupt resolution.

In order to accommodate concurrent data transmission between function modules, the input and output leads of a plurality of such function modules are coupled to an exchange and each of the exchanges may be coupled to a higher level exchange in a recursively hierarchical fashion so as to accommodate any number of such function modules and associated local storages as may be required. Certain of the function modules are provided with different types of I/O interfaces and the respective function modules are designed to be microprogrammed so that different ones of the function modules can be dedicated to particular operational tasks such as I/O control and the like.

A feature, then, of the present invention resides in an information processing system formed of a network comprising a plurality of function modules and a plurality of local storage units, each storage unit being coupled to a different function module for cooperation therewith. Each of the function modules is microprogrammable and the executions performed therein are in response to a pair of associated data structures one of which is an operator (operand) node normally stored in the local storage unit and the other which includes an address part and an argument part, which are transient data items that connect the nodes of a program net. The address part points to the location in a local storage unit of the required operator (operand).

Another feature of the present invention resides in such a network of function modules and local storage units and includes a plurality of exchange units, one for each of a group of such function units, each of such exchange units being coupled to one of a next level of exchange units in a hierarchical fashion to accommodate any number of function units as might be required.

Still another feature of the present invention resides in such an information processing system wherein the local storage units are cyclic and where the information transfer between function units is asynchronous and in either a serial-by-character manner.

DESCRIPTION OF THE DRAWINGS

The above and other objects, advantages, and features of the present invention will become more readily apparent from a review of the following description when taken in relation to the drawings wherein.

GENERAL DESCRIPTION OF THE INVENTION

The system of the present invention is one that takes full advantage of LSI technology to provide a flexible system, which, in turn, can be dynamically partitioned in accordance with various concurrent requirements. The present invention specifically excludes the conventional central processing main frame, main memory and I/O control units. The system includes a network of function modules, each with its won local storage unit. The function of the conventional main memory is provided by the sum total of the various local storage units. Certain of the function modules can be dedicated to I/O functions by particular instructions stored in their local storage units and by interface adapters coupled to those function units.

The system is said to be data driven in that particular instructions of a program are stored in the local storage units of different function modules to establish nodes in a program network (or net), which instructions are called forth when the appropriate data has arrived at that particular function unit. Thus, the instructions of a particular program are distributed throughout a selected number of function modules, which instructions are executed in response to arrival of the associated data, rather than the instructions being executed in a purely sequential manner under control of a program counter as is conventional in prior art centralized systems.

Figure 1:
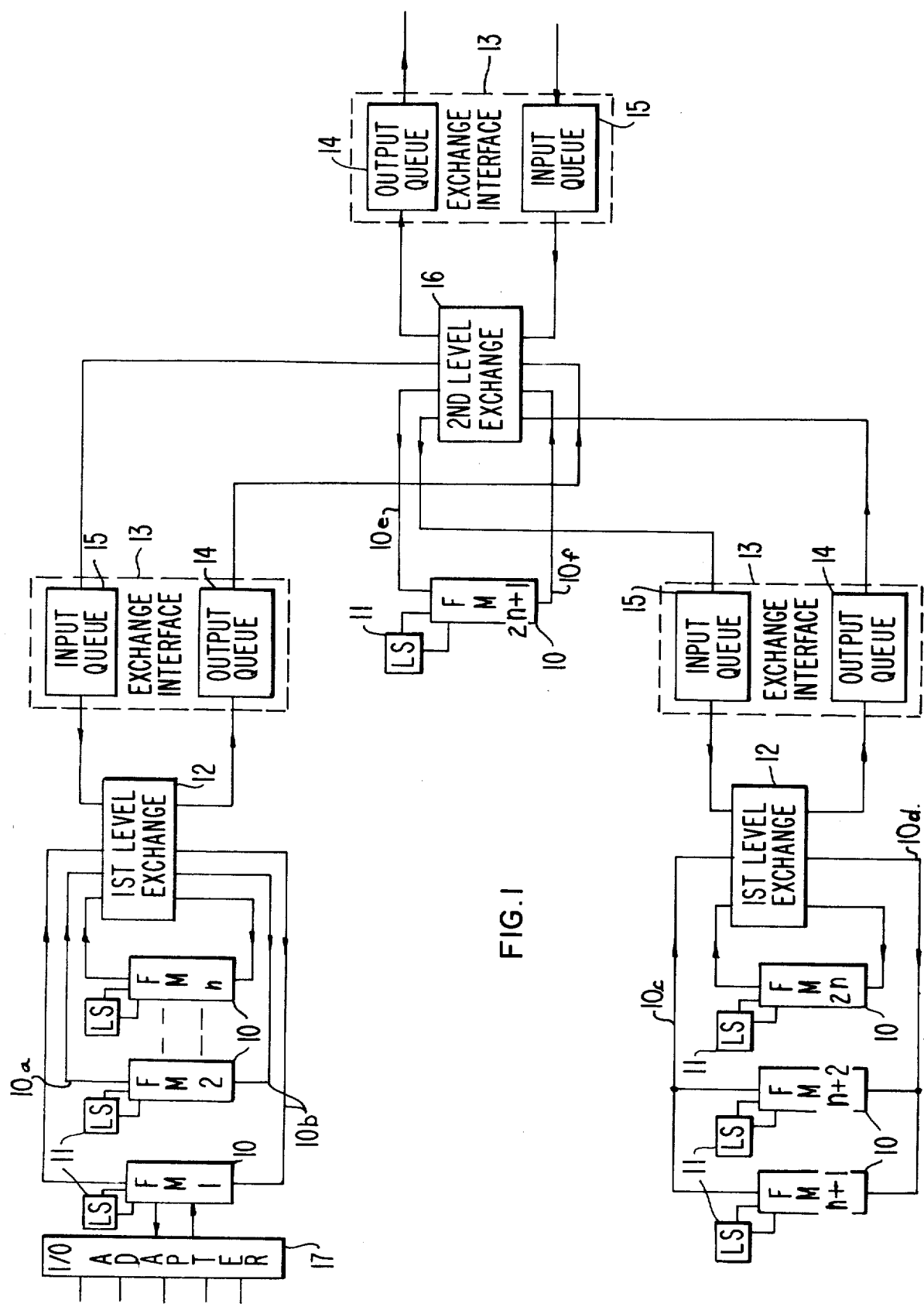
FIG. 1 is a schematic diagram of the data driven network of the present invention.

A system employing the present invention is illustrated in FIG. 1. This system is an array of function modules 10, the internal data transfer of which is synchronous. However, data transfer between modules is asynchronous. As will be more thoroughly described below, data transfer can be viewed as being serial; however, because of the two bit character set employed, data transfer is actually serial-by-character.

Associated with each integrated circuit function module 10 is a local storage unit 11, which local storage units preferably are cyclic in nature so as to readily accommodate the serial data transfer. The various local storage units may vary in storage capacity and access time, as data transfer to and from each function module 10 is asynchronous, so as to accommodate different program or task requirements.

To accommodate asynchronous data transfer between function modules, the function module interface includes the output leads 10a and input leads 10b which couple the respective function modules 10 to first level exchange 12. Exchange 12 is a switching system that will be more thoroughly described below. If the number of function modules required in a particular system exceeds the number that can be accommodated by a particular exchange, then a plurality of such first level exchanges 12 can be coupled to second level exchange 16 by way of an exchange interface 13 associated with each first level exchange. In order to buffer such data transfer, exchange interface 13 is provided with an output queue 14 and an input queue 15. Although not explicitly illustrated in FIG. 1, a plurality of such second level exchanges 16 can then be coupled to a next higher level exchange by way of an exchange interface 13 and so forth. Thus, any number of function modules can be accommodated by a hierarchy of nested exchanges. The various level exchanges 16 are similar to first level exchange 12. It will be understood that if the number of function modules required can be accommodated by two first level exchanges 12, those two exchanges can be interconnected by way of a single exchange interface 13 where output queue 14 for one exchange becomes input queue 15 for the other exchange. As further illustrated in FIG. 1, certain of function modules 10 can be connected to a common bus 10c.

As illustrated in FIG. 1, the network hierarchy is recursive in nature. For example, the data communication between function module FM $2n + 1$ and second level exchange 16 is of the same nature and format as is the data communication between any of the exchange interfaces 13 and second level exchange 16. The circuitry of second level exchange 16 and first level exchange 12 will be discussed below in relation to FIG. 11. Therefore, any function module 10 can be replaced by an exchange interface 13 and an exchange 12 which is coupled to a plurality of function modules 10, and vice versa. It will be noted in FIG. 1 that two exchanges 12 are coupled to exchange 16 by way of exchange interfaces 13 and, also, a function module 10 is coupled to exchange 16 by buses 10d and 10e.

To accommodate date transfer and other communication with device outside the system, one or more of the function modules is provided with an I/O adapter 17 with the data transfer occurring control or particular instructions stored in the local storage of the corresponding function module. Of course, if the peripheral devices external to the system contain their own control units, then those devices may be coupled directly to a first level exchange in the same manner as the function modules associated with I/O adapter 17.

Figures 2, 3A, 3B, 4:
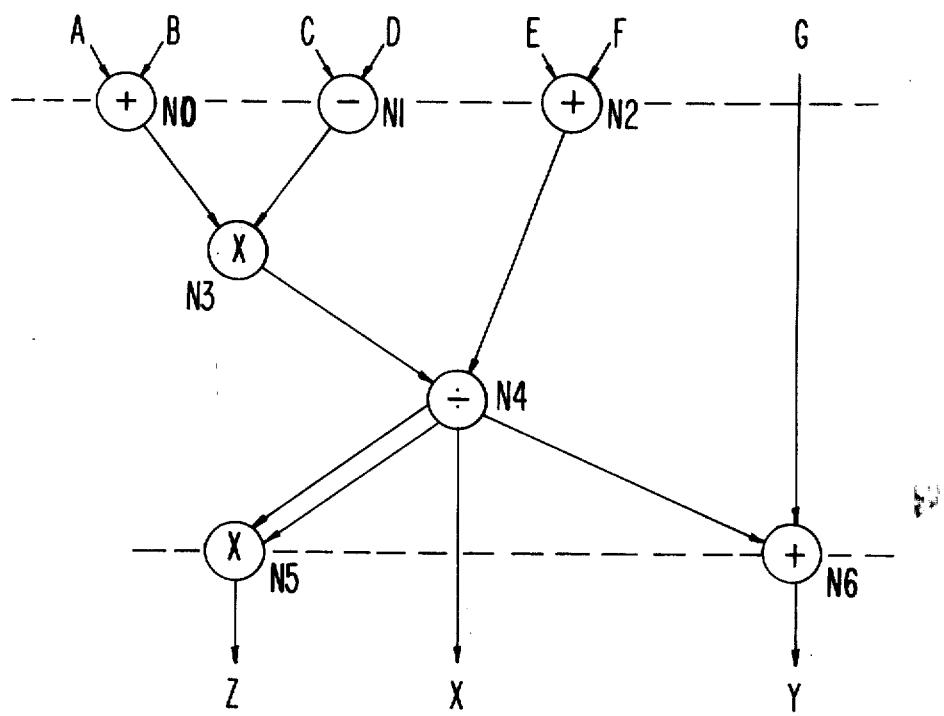
FIG. 2 is a table representing the character set employed by a function module of the present invention.
FIGS. 3A and 3B are representations of the data structure formats employed in the present invention.
FIG. 4 is a diagram of a program net illustrating the operation of the system in the present invention.

Before describing the operation of the system and the nodal form of program nets, a description will now be provided of the instruction format which includes a definable field mechanism. That is to say, data fields and instructions are of variable length. It is to be remembered that the information transfer may be viewed as being serial and, therefore, no restrictions are placed upon the length of information segments as might occur in machines with fixed data path widths. The information structures are formed of a series of characters which are illustrated in FIG. 2. Each character comprises two bits which allows for four different characters, which, as illustrated in FIG. 2, are (,), 0, and 1. Throughout this description, the parentheses may be referred to as brackets and it will be understood that those two terms can be interchanged.

The data structure format formed from this character set will now be described in relation to FIG. 3A and FIG. 3B. These structure formats define a series of what are generally referred to as data cells. Since the data transfer is serial-by-character, the two bit character set of FIG. 2 implies that the data bus which makes up the various information routes is to be two bits wide. With a two bit data bus, the bit patterns representing the data structure of FIG. 3A would be as follows:

(() 5 (---))
b1 1101011---00
b2 0011010---11 where the number 5 is represented by the pure binary characters 1,0,1, i.e. in scanning from left to right, the first data character represents the existence or lack of numeral 1, the second data character represents the existence or lack of the numeral 2, the third data character represents the existence or lack of numeral 4 and so on. Codes other than the pure binary code also may be employed. It will be understood that a single bit data path could be used if a two phase clock is employed. It will be further understood that codes existing outside of a parenthetical expression represent the nature of the next field within a parenthetical expression (as will be more fully described below). Certain rules of construction are to be applied to the interpretation of such a format. For example, the adjacent pair of opening parentheses or brackets indicates the beginning of a data structure and the adjacent pair of closing parentheses indicates the end of the structure. The various fields within the data structure are defined by pairs of opening and closing parentheses or brackets. Thus, the structure as well as the various fields within the structures can be of any length. By definition, no data can exist between pairs of like parentheses or brackets.

As illustrated in FIGS. 3A and 3B, the inner-contents of a pair of parentheses or brackets represents data while the outer-contents or information preceding a parenthetical expression is a tag defining the significance of the inner-contents of that expression. A representative set of tags may be defined as follows: 0 indicates that the following inner-contents constitute a function module address; 1 indicates that the following inner-contents constitute a local store address; 2 indicates that the following inner-contents are an index address qualifier; 3 indicates that the following inner-contents are a name address qualifier; 4 indicates that the following inner-contents are an operand modifier; 5 indicates that the following inner-contents are an operator code or cell type designator; 6 indicates that the following inner-contents are a destination address; and 7 indicates that the following inner-contents are an operand field. A more detailed example of tags which may be employed with the present invention is provided below. A more detailed explanation of FIGS. 3A and 3B is also provided below.

A particular feature of the character set as illustrated in FIG. 2 is the parity check which is provided. It will be noted that for each parenthesis or bracket character in a structure or field, there will be an opposite parenthesis or bracket character, each character comprising a single one bit. Furthermore, the data characters will either have no one bits or two one bits. Thus, all structures, or fields within a structure, will have an even number of one bits if the instruction has been properly coded. This provides for an even parity checking scheme.

As has been stated above, the system of the present invention is data driven. Rather than being called forth by program counter, an operator is called forth and executed only when the appropriate data has arrived at the function module. If the instruction calls for the combination of two data items, e.g., A and B, the instruction will be executed only when both data items have arrived at the function module regardless of the order in which they are received. The instruction will not be called forth for execution until both data items have arrived at the function module. With such a data driven system, the program can then be represented as a program net wherein the individual instructions of the program constitute nodes in that net. An exemplary program net is illustrated in FIG. 4. The program represented by this net is designed to calculate the values of X, Y, and Z, according to the following algebraic equations:

$$X = ((A + B)(C - D))/(E + F)$$

$$Y = X + G$$

$$Z = X \cdot X$$

In the tree structured program net of FIG. 4, node N0 represents the operation A + B, node N1 represents the operation C − D, node N2 represents the operation E + F, N3 represents the multiplication of A + B and C − D, node N4 represents the division of that multiplication product by E + F, node N5 represents the multiplication of X times X, and node N6 represents the addition of X and G.

Taken as FORTRAN statements, the above equations compile into 23 prior art sequential large computer language instructions. Now, if one function module of the system in the present invention is employed to execute the required calculations, and if the transition time across one node is considered to be one time unit, the execution time for the above equations would be seven time units. This assumes that all the instructions required for the respective operations, that is, all seven nodes of the program, are stored in the local storage unit of the function module and that all of the inputs are available.

It will be noted from the tree structured program net of FIG. 4 that nodes N0, N1, and N2 may be executed simultaneously or sequentially in any order and thus are concurrent. Similarly, nodes N5 and N6 are concurrent. Two tasks are said to be concurrent if and only if they may be executed simultaneously or sequentially in any order, without changing the final result.

If an array of function modules such as illustrated in FIG. 1 is employed to calculate the above expressions, three function modules would be required with the instructions representing nodes N0, N1, and N2, residing in different ones of the function modules and nodes N5 and N6 residing in different modules. As would be recognized from the program net of FIG. 4, the execution time for the calculation of the above algebraic equations then would be four time units. The employment of more than three function modules would have no effect on the speed of this algorithm.

Furthermore, it will be noted from the program net of FIG. 4 that different operations are performed on A and B as that data passes from Node N0 to node N3 to node N4 and so forth. Thus, there is a pipeline effect, of sorts, in the operations performed on the data as the data is transferred from node to node or from function module to function module. The degree to which this pipeline effect is achieved is, or course, dependent upon the transfer rate between function modules. It will be understood that the program net represented in FIG. 4 can be expanded to include as many nodes as are necessary to represent any given program or groups of programs. That is to say, the system can be expanded to readily accommodate multiprogramming which, in this system, incidentally includes multiprocessing.

As thus described, the present system encompasses an array of function modules that can be programmed to accommodate a number of different program nets. As was explained above, the different local storage units can differ from disc files to disc packs, and so forth. Thus, performance of each of the function modules can differ as might be required by the programs to be implemented. That is to say, there can be a trade-off of storage capacity versus speed as might be required for different applications.

DETAILED DESCRIPTION OF THE INVENTION

Figure 5:
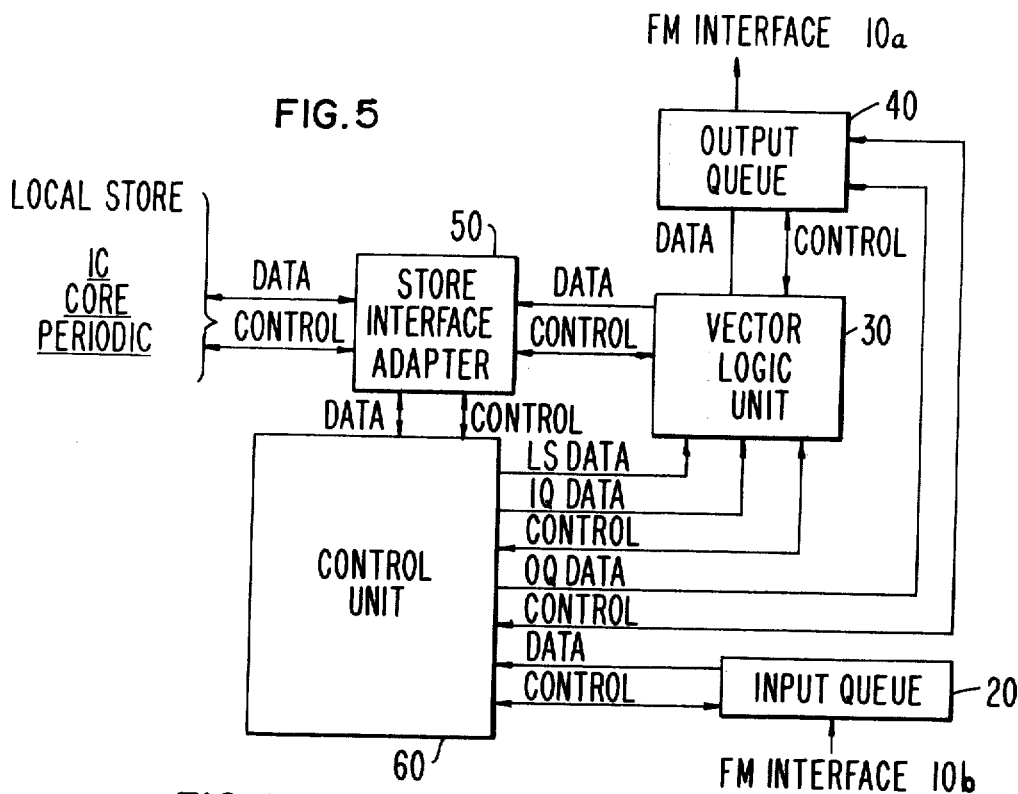
FIG. 5 is a schematic diagram of the function module as employed in the present invention.

A system employing the present invention having been generally described, a more detailed description will now be provided of the function modules 10 that were referred to in reference to FIG. 1. These function modules are the building blocks out of which the system of FIG. 1 is formed. As illustrated in FIG. 5, the function module is composed of a number of functional units which operate together to perform the functions that have been described above. These units include input queue 20, logic unit 30, output queue 40, local storage interface adapter 50, and control unit 60.

The input queue receives data from, for example, exchange 12 of FIG. 1, by way of its corresponding input bus and stores the data while waiting for control unit 60 to become available.

When a data structure reaches the top of input queue 20, control unit 60 processes the data structure in conjunction with a node or instruction in the associated local storage unit 11 of FIG. 1. Control unit 60 may utilize logic unit 30 to perform the necessary operation. The result of the operation may be sent to output queue 40 along with a destination address. When this result reaches the top of output queue 40, it is sent to the desired destination by way of the function module interface including output bus 10a and first level exchange 12 as illustrated in FIG. 1.

Figure 6:
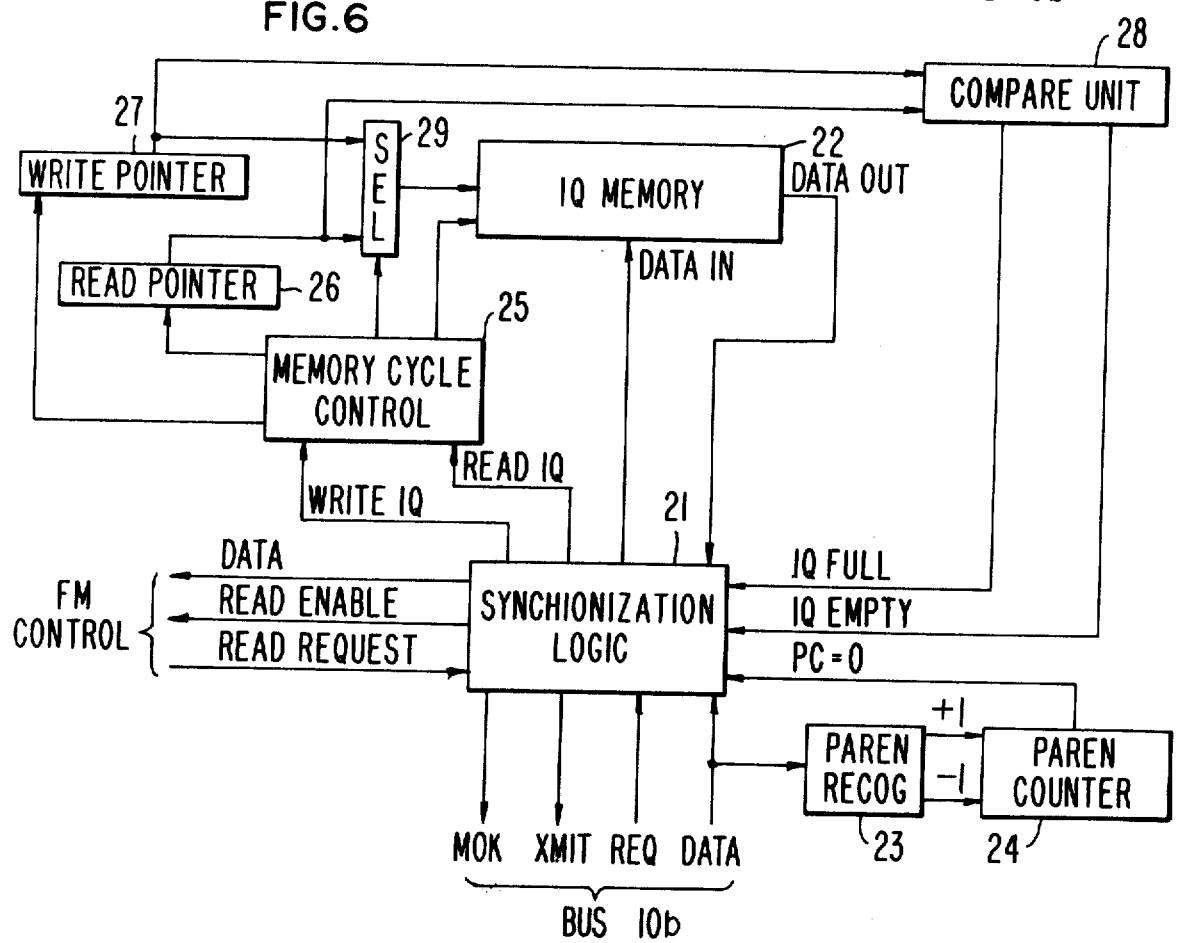
FIG. 6 is a schematic diagram of the input queue as illustrated in FIG. 5.

Input queue 20 is illustrated in more detail in FIG. 6. The input queue includes input queue memory 22 and logic for controlling data transfer between function module interface bus 10b and input queue memory 22. The interface logic includes synchronization logic 21 which synchronizes the incoming data with an input queue memory clock. Parentheses recognition unit 23 and parentheses counter 24 perform error detection for the interface. It will be remembered from the general description of the data structure formats (see above) that for every opening parenthesis or bracket in that structure, there should also be a closing parenthesis or bracket. Parentheses counter 24 is a binary up/down counter and is incremented by one for every opening parenthesis or bracket detected by parenthesis recognition unit 23 and decremented by one for every closing parenthesis or bracket so detected. Thus, the contents of parenthesis counter 24 should be zero before and after the reception of a complete instruction format. Otherwise, an error is noted by synchronization logic 21 that in turn initiates a retry of incoming data transfer.

Synchronization logic 21 serves to transfer incoming data to input queue memory 22 and from there to control unit 60 of FIG. 5. Input queue memory 22 is write accessed upon request from function module interface 10b and is read accessed upon request from function module control unit 60 (see FIG. 5). Upon receiving a write request, memory cycle control 25 activates select gates 29 to transfer an address from write pointer unit 27 to input queue memory 22. When a read access has been received, select gates 29 are activated to transfer an address from read pointer unit 26 to input queue memory 22. Compare unit 28 is provided to compare the values of write pointer unit 27 and read pointer unit 26. If the values are not equal, compare unit 28 signals control unit 60 (see FIG. 5) that data is in the input queue memory. If the respective values are equal, compare unit 28 signals control unit 60 that either the input queue memory 22 is full or empty, depending upon whether the last unique memory operation was a write or read operation, respectively.

Figure 7:
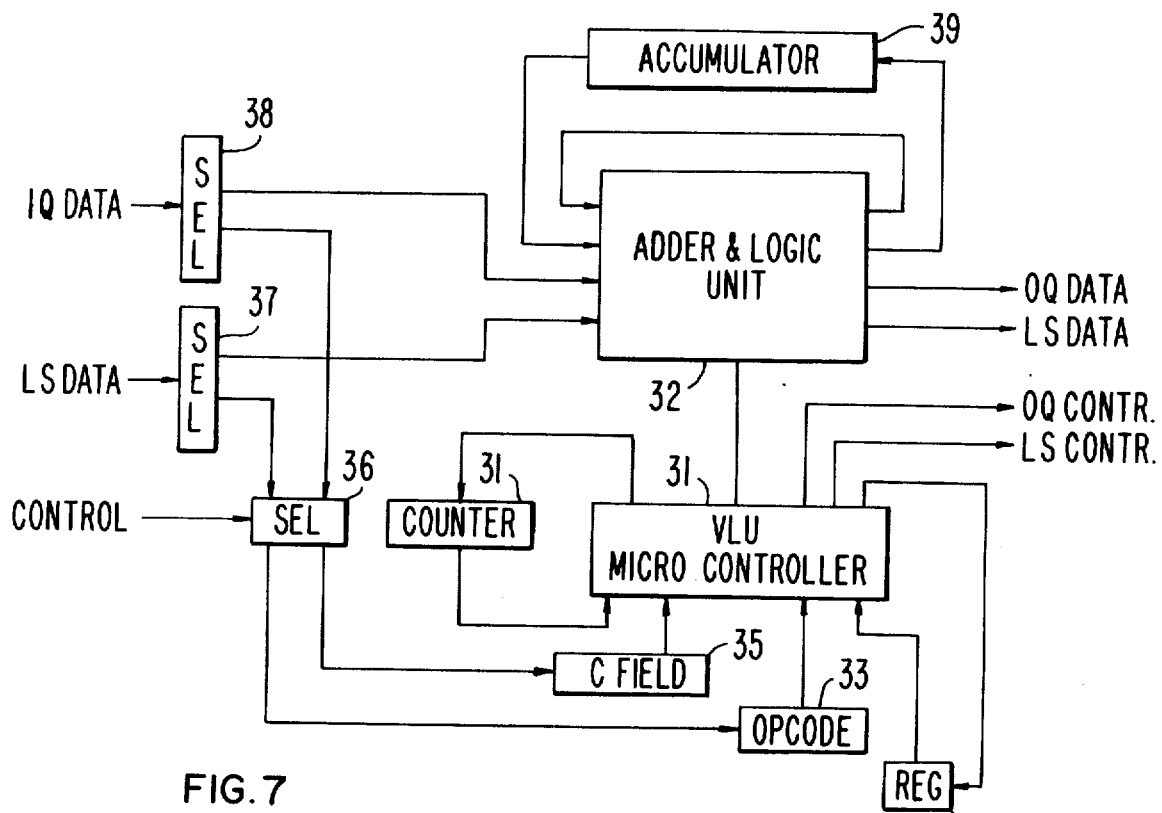
FIG. 7 is a schematic diagram of the logic unit as illustrated in FIG. 5.

Logic unit 30 of FIG. 5 is illustrated in more detail in FIG. 7. Adder and logic unit 32 performs all the logic operations to be performed by the function module and, in a preferred embodiment, is a two dimensional table lookup memory. Accumulator 39 is provided to aid in the arithmetic operations, which, it will be remembered, are performed in a serial fashion. Execution of the various operations is initiated by microcontroller 31 which decodes operation codes in op code register 33. C field register 35 provides modifying information as to whether the results of the logic operations are to be transferred to the output queue or back to local storage unit 11 of FIG. 1. Microcontroller 31 is provided with counter 31a which performs any incrementation or decrementation that might be required of the control information. Operation codes are supplied to op code register 33 from local storage unit 11 (see FIG. 1) by way of select gates 36 and 37. Control information is supplied to C field register 35 either from the local storage unit or from the input queue 60 (see FIG. 5) by way of select gates 36 and 38. Microcontroller 31 is also provided with a second register 34 which is a temporary storage that has a capacity of 1,024 characters.

Figure 8:
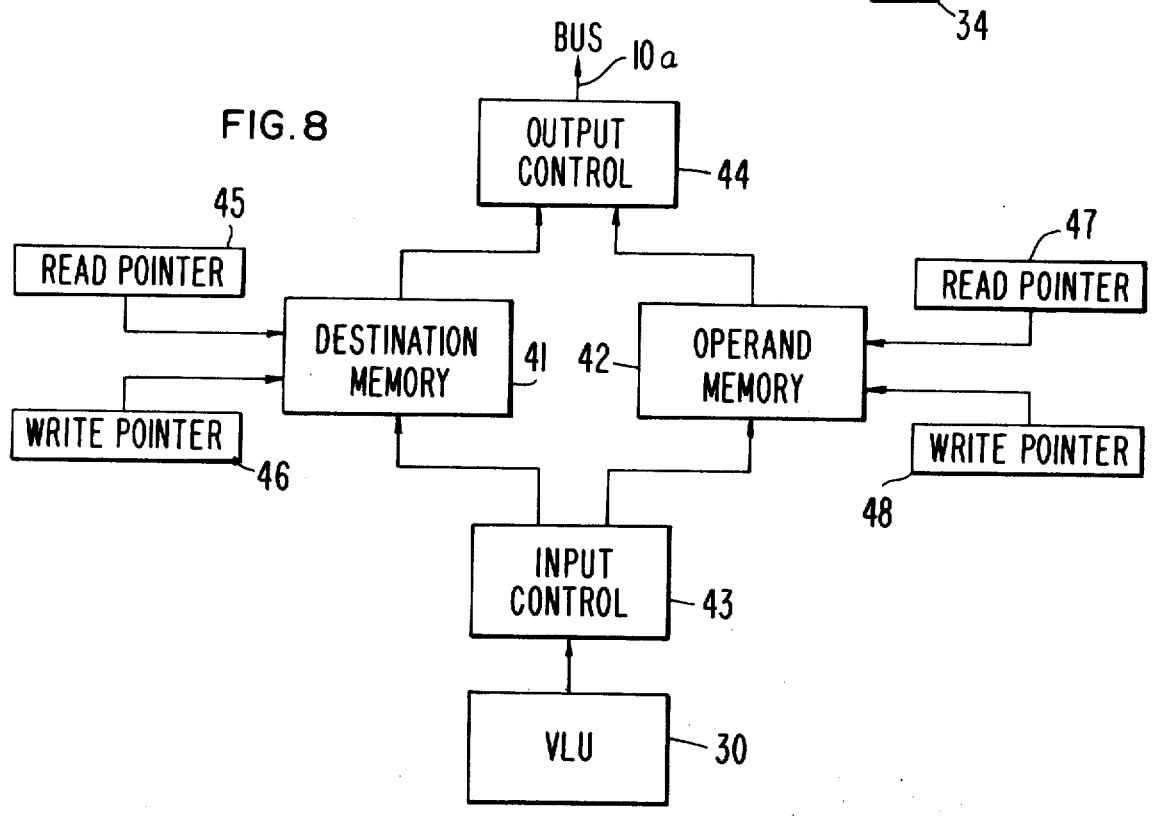
FIG. 8 is a schematic diagram of the output queue as illustrated in FIG. 5.

Returning again to FIG. 5, output queue 40 is essentially a buffer for messages being sent from a particular function module to another function module. In addition, output queue 40 may be coupled to input queue 20 by way of the function module interface which includes output bus 10a, input bus 10b and exchange 12. The output queue is illustrated in a more detailed form in FIG. 8. The output queue consists of two independent queues, one for operands and one for destination addresses. The former is illustrated in FIG. 8 as operand memory 42 and the latter is illustrated in FIG. 8 as destination memory 41. Read pointer register 45 contains the address at which destination memory 41 is to be accessed for read operations, while write pointer register 46 contains the address at which destination memory 41 is to be accessed for a write operation. Similarly, read pointer register 47 and write pointer register 48 contain the addresses at which operand memory 42 is to be accessed for read and write operations, respectively. Input control unit 43 receives operands and destination addresses from logic unit 30 for transfer either to destination memory 41 or operand memory 42.

Output control unit 44 receives operands and destination addresses from the respective memories and creates the data structure that is to be transferred over output bus 10a of the function module interface. The data transfer from the output queue begins by the initiation of the transmission of destination address. The output queue then determines the appropriate position in that data structure for the operand to be inserted.

Figure 9:
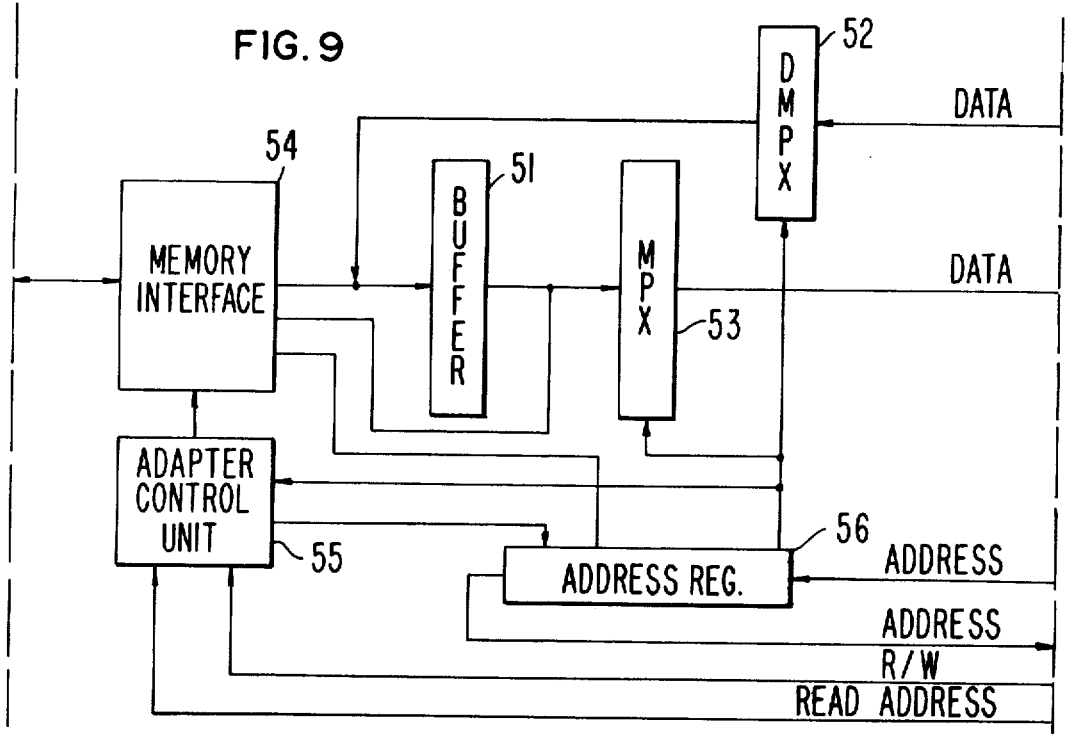
FIG. 9 is a schematic diagram of the storage interface adapter as illustrated in FIG. 5.

The storage interface adapter 50 of FIG. 5 is illustrated in more detail in FIG. 9. This adapter receives addresses and data for transfer to the local storage unit. The particular adapter illustrated in FIG. 9 is designed to provide parallel access to a random access memory. To this end, buffer register 51 is a 16-character register adapted to receive a word of such characters in parallel from memory interface 54 for transfer to "multiplexor" 53 for conversion to a serial string of such characters. This conversion is accomplished by reading out the different character positions in "multiplexor" 53 in accordance with the least significant four characters of the local store address in address register 56. For data transfers to the memory, characters are received serially by "D multiplexor" 52 where they are assembled into 16-character words at character locations determined by the least significant four characters in address register 56. The assembled words are transferred from "D multiplexor" 52 to buffer register 51 and from there to the memory interface 54. The remaining portions of address register 56 are also transferred to memory interface 54 to provide the memory address for accessing the local storage unit. Adapter control unit 55 serves to initiate an address transfer from address register 56 to the memory interface 54 and also to increment and decrement the address control.

It will be understood that when other types of memories such as periodic or cyclic stores are employed, a different memory interface and local storage adapter would be employed. However, the interface between the adapter and the function module will be the same, and, as in FIG. 9, will include: a serial-by-character data line from the function module, a serial-by-character data line to the function module, a serial-by-bit address line from the function module, a serial-by-bit address line to the function module, a read/write control line, an increment and decrement address control line, and a transmit address control line.

Referring again to FIG. 5, control unit 60 serves to process tags and to send data, as defined by the tags, to logic unit 30, if that data is either an operator or an operand, to output queue 40 if that data is a destination address, and to local storage unit 11 of FIG. 1 if that data is an operand or an address to be stored in the local store. All the data from input queue 20 will first pass through control unit 60. Data input is accepted from either input queue 20 or local storage unit 11 (see FIG. 1) as a source.

Figure 10:
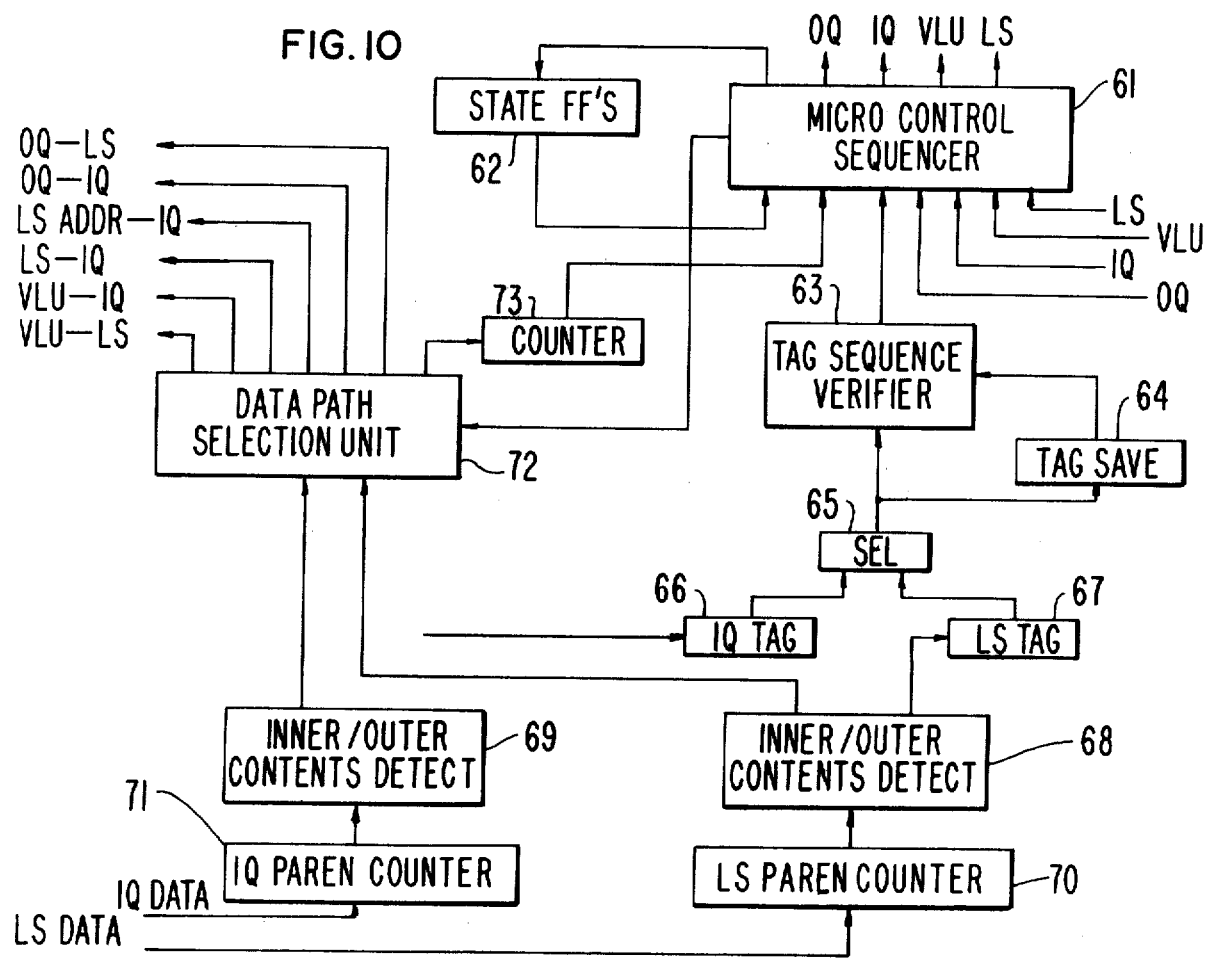
FIG. 10 is a schematic diagram of the control unit as illustrated in FIG. 5.

Control unit 60 is illustrated in more detail in FIG. 10. As shown therein, data from the input queue and from the local storage unit is received respectively by the input queue parenthesis counter 71 and the local storage parenthesis counter 70. The parentheses or bracket count determines whether the data constitutes the inner or outer-contents of the data structure. If the data is an inner structure, it represents an operator, operand, or other information and is transferred to data path selection unit 72 by either inner/outer-contents detector 68 or 69 depending upon whether the data was received respectively from local storage or the input queue. If the data is an outer-contents, it represents a tag and is transferred respectively to local storage tag register 67 or input queue tag register 66, again depending upon whether it comes from local storage unit or from input queue. The contents of input queue tag register 66 and local store tag register 77 are selected by select gate 65 for transfer to tag sequence verifier 63 or they may be saved in tag save register 64 for future reference. Microcontrol sequencer 61 is a table lookup read-only memory (ROM) and provides the various sequences of control signals required to initiate the respective operations in the other units of the function module under control of the tag sequence verifier 63 and other modifying data as is received from those other units as well as data from counter 73 and state flip-flops 62 which indicate the particular machine state that the function module is in. State flip-flops 62 are set by the microcontroller in accordance with the particular sequence that was called for by the tag operator.

Figure 11:
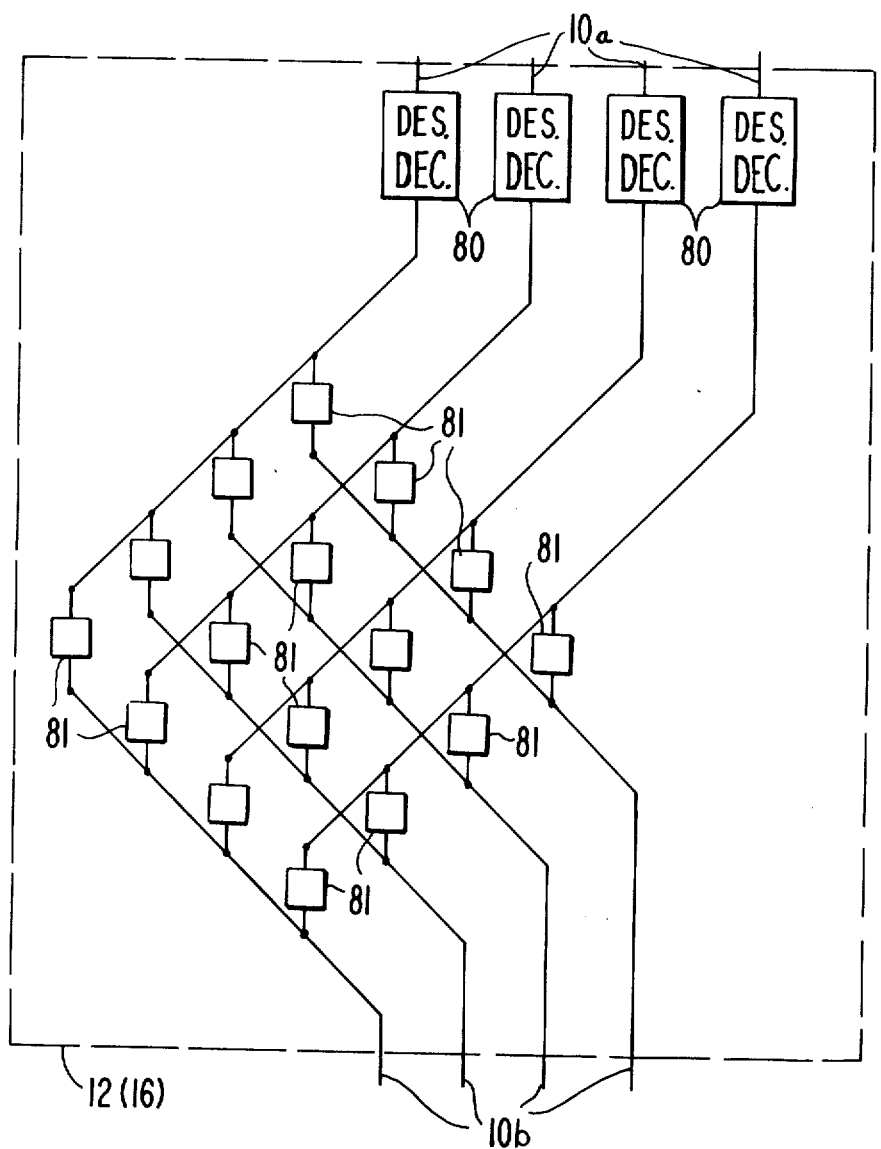
FIG. 11 is a schematic diagram of an exchange as illustrated in FIG. 1.

The respective exchanges 12 and 16 of FIG. 1 are illustrated in more detail in FIG. 11. As was described above, every data structure transmitted over an interface bus will contain a function module designation as the first field or data item in that data structure. This function module designation is an address by which a data structure is switched to the appropriate function module by the exchange. In FIG. 11, data structures are received over a respective bus 10a by a corresponding address decoder 80. That address decoder 80 decodes the function module designation and conditions one of the transmission gates 81 to select the appropriate bus 10b for transmission to the designated function module. In this manner, any one of the respective buses 10a can be coupled to any one of the respective buses 10b upon the conditioning of the appropriate transmission gate 81.

In the situation where two or more function modules are coupled to the same interface buses, each function module will be provided with its own designation decoder and the respective designation decoders 80 in FIG. 11 would select the same output bus 10b in response to two or more different function module designations. When a system employs two or more first level exchanges 12 that are then coupled to second level exchange 16, the function module designation field will be expanded in length and the respective decoders 80 of exchange 16 can be adapted to decode only one portion of the designation field so as to select an appropriate first level exchange 12. The respective decoders 80 of exchange 12 would only decode a second portion of the designation field to select the appropriate function module. When three levels of exchanges are employed, the designation field will again be expanded and so forth.

FUNCTION MODULE OPERATION

Instruction interpretation begins by first analyzing the data item presented by the input queue. Input queue analysis continues until an unsatisfied state is sensed, whereupon analysis of the data item of the local storage commences. Instruction interpretation continues until the complete pair of cells have been interpreted (bracket count 0) or a non-sense state has been sensed. The normal instruction interpretation cycle terminates when the bracket count is equal to 0, and, in turn, activates interpretation of the next input queue data item or cell. Instruction interpretation cycles terminating because of sensing of a non-sense state results in a machine generated interrupt. The actual machine execution is carried out under control of micromachine instructions which are derived from the read-only memory of microcontrol sequencer 61 (see FIG. 10) of the control unit by interpretation by the control unit of both inner and outer-content data of the data cell pairs presented by the input queue and a local storage area.

The function module, as illustrated in FIG. 5, executes from a pair of associated data structures, one in the input queue 20 and one in the local storage unit 11 (see FIG. 1). Every structure in input queue 20 consists of an address part and an argument part. The address part points to the local storage location allowing the association of the two data structures to be made. Control begins with the first construct of the input queue data structure and it continues until a construct is encountered which is not a valid successor of the previous construct as defined by the valid sequence flow. The last construct is then saved and control is transferred to the next construct in local storage unit 11 which is tested as a possible valid successor. If it is not, then an error results. If the next construct is a valid successor, control remains with the local storage unit and continues until a non-valid successor is encountered, at which time control is transferred back to input queue 20.

There are times when input queue 20 and local store 11 are scanned simultaneously. This occurs during a dyadic operation when both operands are present in the respective units. Upon completion of the simultaneous scan, control is transferred to the local storage unit. This process continues until the end of the input queue data structure is detected, in which case the operation has been completed.

Because the procedure of scanning the respective structures is simultaneous, checking the validity of a data structure by itself is not meaningful. Therefore, the respective structures should be viewed as meaningful pairs. Valid structures are pairs of data structures, one in the input queue and one in the local storage, which, if scanned in the above-described scanning manner, result in valid sequence of constructs. A valid sequence of constructs is defined as a valid sequence of tags. In interpreting the valid sequence flows, it is not necessarily the sequence of actual encounter of tags that is important, but rather the sequence in which they are to be executed. Because of the scanning rules and nature of the structures, data structures entered into the input queue must take the form (( )0( )1( )---). In that structure, the parentheses or brackets before the numeral 0 indicate the beginning of a data structure, the contents of the brackets after the numeral 0 represent a function module address and the contents of the brackets after the numeral 1 represent the address in the local storage unit of the associated data structure required to complete the co-routine. The remaining constructs in that data structure can be any sequence of constructs which has balanced parentheses count and which results in a valid tag sequence. Similarly, data structures contained in the local storage unit must take the form (( )---). During data transfer from the input queue to other units of the function module, including the local storage, the fields are separately transferred with the opening bracket structure (() removed. The bracket structure is again added to the data structure as it is formed in the local storage.

Data structures may be processed in either direction, left to right, or right to left. The direction of processing is determined by the initial parenthesis or bracket addressed in the local storage unit. A right to left scan is interpreted as a mirror image of a left to right scan. During a left to right scan, data characters are interpreted directly as they are scanned and left and right parentheses are interpreted as right and left parentheses, respectively. Data structures are always addressed beginning at a parenthesis or bracket. The direction of the scan may only be changed by an explicit instruction.

As thus described, the operand and control data sets pertaining to an integral machine instruction cycle are supplied by the data items presented by both input queue 20 and local storage unit 11. The processor module is stimulated into an instruction interpretation cycle upon recognition of the presence of a data item at the top of the input queue. The data item presented by the input queue is prefaced by an address which links it to its related data item in the function module's local storage unit.

FIG. 3A is an example of a data structure that is normally stored in the local storage unit while FIG. 3B is a data structure of the type normally received as input information. It will be noted from FIGS. 3A and 3B that each data structure begins, in a left to right scan, with two opening parentheses or brackets in succession followed by a closing parenthesis or bracket. The first field, preceded by the numeral 5 is a condition field which is employed as an N way branch to one of N destination address lists. Each address list may contain multiple destination addresses as indicated in FIG. 3A. The second field in the data structure of FIG. 3A is preceded by the character C which indicates that the inner-contents of the cell constitutes control information. The third field in FIG. 3A is an operand as indicated by the outer-contents or tag 7 as was generally described above. The remaining fields are destination addresses.

In FIG. 3B, the first field after the beginning of the data structure is a function module designation as indicated by the preceding outer-contents or tag 0. The second field is the local storage unit address of an associated data structure, such as illustrated in FIG. 3A. In FIG. 3B, this local storage unit address is designated by the previous outer-contents or tag 1. The next field in the data structure of FIG. 3B is an address qualifier as indicated by the outer-contents or tag AQ. The last field in the data structure of FIG. 3B is an operand.

FIELD TAGS AND FORMATS

The various types of tags or outer-contents are described below. These tags include: address tags, level tags, address modifier tags, operator and control tags, operand tags, destination address tags, microstring operator tags, and state information.

The address tags include function module address, local storage address, and address qualifiers. Other address tags will now be described. The dyadic ops tag indicates that the inner-contents of the following parenthetical expression specifies that the following operand is a left or right operand. The condition field tag indicates that one of the following inner-contents specifies whether the accompanying operand is to be treated as a Boolean or an operand. The composition field tag indicates that the following inner-contents specifies the subscript of the presence bit in associated operand field into which the operand is to be written. The decomposition field tag indicates that the following inner-contents specifies the number of bits to be selected from the operand field in the input queue. These bits are to be used as index pointer to select a microstring. The lock field tag indicates that the following inner-contents specifies whether the net protected by the lock field is to be locked or unlocked.

Level tags are indicated by the alphanumeric character L and indicate that the following inner-contents of a parenthetical expression constitutes level information. This information is ignored by function module.

The address modifier tags are the node index tag, the name tag, and the address modifier tag. The node index tag is indicated by the numeral 2 and specifies that the local storage address is to be sequenced to the indicated node at the current level. Upon completion, the level of interpretation drops one level. The name tag is indicated by the numeral 3 and specifies that the local storage address is to be sequenced to the indicated node by comparing the name tag against the outer-contents of the address structure at the current level. Upon completion, the level of interpretation drops one level. The address modifier tag is represented by the characters AM and indicates that the following inner-contents constitutes an operator code to be used as an address modifier for the local storage address.

The operator and control tags will now be described. The numeral 4 indicates that the inner-contents of the following parenthetical expression constitutes an operand modifier op code. The numeral 5 indicates that the following inner-contents constitutes the dyadic operator code, monadic operator code, or a cell type. The character A indicates that the following inner-contents constitutes an accumulator dyadic operator code. The character I indicates that the following inner-contents constitutes an indexed dyadic operator code. The character Z indicates that the following inner-contents constitutes a "zap" dyadic operator code. The characters ZA indicate that the following inner-contents constitutes a "zap" accumulate dyadic operator code. The characters ZI indicate that the following inner-contents constitutes a "zap" index operator code. The characters MS indicates that the following inner-contents constitutes a microstring of code which is used in the decomposition function. The character C indicates that the following inner-contents constitutes control information for a specific cell or operator.

The microstring operator tags will now be described. The character " indicates that the inner-contents of the following expression constitutes a literal which is to be transferred to the output queue. The charracter E indicates that the following inner-contents constitutes an unsigned operand which defines the skip value for the local storage address register. The skip is the same as the current direction. The character F indicates that the following inner-contents constitutes an unsigned operand which defines a skip value for the input queue address register. The direction of the skip is left to right. The character B indicates that the following inner-contents constitutes an operand which specifies the number of bits to be transferred from the operand in the input queue to the output queue. The character M indicates that the following inner-contents constitutes an operator code to be used within a microstring.

It will be understood that the following fields are considered as operands: the function module designation, the local storage unit address, the node index, address modifier, the microstring operators which were defined above as being designated by the characters ", E, F, and B, as well as the operand field itself. The operand tag 7 is also used on structures which are being passed by the read and write operators.

Signed operands have the format (S A0 A1 ... An) where A0 is the least significant bit and S is the signed bit, S = 0 being positive. Unsigned operands have the format (A0A1 ... An). The length of the field is variable up to some specified amount. Since the inner-contents of a field are defined to be operands, no parentheses or brackets are allowed within the operand field. The following fields have formats similar to unsigned operands: name tag address modifier, the operand modifier op code, the dyadic/monadic operator code or cell type, the accumulator dyadic operator code, the index dyadic operator code, the "zap" dyadic operator code, the "zap" accumulate dyacdic operator code, the "zap" index operator code, the destination addresses, the address modifier, and the operator code to be used within a microstring.

The control field may include a condition cell, a position cell, a lock cell or a dyadic operator. The condition cell has the format C(R,C0,PB,P0,B0,B1, ... ,Bn). R is a reset bit which, if set, indicates that the next operand, directed to this node, should be ignored and the only action required is the resetting of the reset bit. PB is a Boolean presence bit. P0 is an operand presence bit, C0 is an operand constant bit, B0 ... Bn are Boolean's with a minimum length of one character and a maximum length of eight characters.

The composition cell as a control field has the format C(C0,P0,C1 P1, ... ,CnPn) where the Cn is a constant bit for the nth operand and Pn is the presence bit of the nth operand. The lock cell has a single lock bit and is of the format C(L). The dyadic operator has the format C(R,C,PL,PR) where C is the constant bit and, if equal to one, indicates that the P bit is not to be reset. PL is the presence bit for the left operand and PR is the presence bit for the right operand.

Address qualifier fields include a composition cell, a condition cell, dyadic ops, a decomposition cell, and a lock cell. The composition cell is of the format AQ(n) where n is an unsigned operand whose length is a maximum of eight bits. The condition cell is a one bit cell of the format AQ(n) where n equal 0 indicates a Boolean and n = 1 indicates an operand. Dyadic ops is of the format AQ(n) where n = 0 indicates a left operand and n = 1 indicates a right operand. The decomposition cell is of the format AQ(n) where n is an unsigned operand with a maximum length of 10 bits. The lock cell is a one bit cell of the format AQ(n) where n = 0 specifies lock and n = 1 specifies unlock.

The destination address is a structure which must take the format 6(()0()1(LS) ... ) where the only limitation on the data which follows the local storage address LS is that that data and the node to which the destination address is being directed must meet the syntax requirements for data structures. The one exception to the above destination address format is the null address which is of the format 6(()).

A microstring is a structure which must take the following format NS(() ... ). The microstring may only contain tags of six for conditional cells. For decomposition cells, the microstring may contain combinations of the following tags: ", B, E, F, M, AQ, MS and 6, which tags have been defined above.

CELLS AND OPERATORS

The conditional cell is used as an N way branch to one of N destination address lists. Each address list may contain multiple destination addresses. The composition cell is used to collect and then catenate a number of operand fields. The result may be one or more operands. When all operands have arrived, the resulting operands are sent to the destinations. The decomposition cell is used to decompose the operand presented by the input queue as determined by the cell's microstring. The lock cell is used to lock and unlock a net.

The arithmetic/logical monadic operators will now be described. ANY 1 causes the transfer of an operand with a value of "1" to the appropriate destinations if the operand contains any character with a value of 1. Otherwise, a zero is transferred. ANY 0 causes the transfer of an operand with the value of one to be appropriate destinations if the operand contains any character with the value of 0. Otherwise, a zero is transferred. COUNT OF 1's causes the transfer of an operand to an appropriate destination with a value equal to the number of "1" characters present in the operand. COUNT OF 0's causes the transfer of an operand to an appropriate destination with a value equal to the number of "0" present in the operand.

There are five read/write operators which will now be described. READ STRUCTURE causes the transfer of the contents of the addressed local storage to appropriate destinations. If the addressed local storage subspace contains a structure, the structure is transferred as a field with the tag of 7. DELETE PARENS causes a fetch of the addressed structure and a deletion of all parentheses or brackets and outer-contents. The result is sent to an appropriate destination with a tag of 7. WRITE STRUCTURE causes the transfer of the structure following the operator from the top of the input queue into the addressed local storage subspace. The parentheses or bracket definition for both before and after the transfer are checked for equality. WRITE STRUCTURE TRANSPARENT causes the transfer of the next structure from the top of the input queue into the addressed local storage subspace. The structure is stored in its parenthesized or bracket form. WRITE VECTOR PARSED causes the transfer of the next operand from the top of the input queue into the addressed local storage subspace. The incoming bit vector is parsed to the local storage as defined by the parenthetical definition of the local storage subspace, READ CHARACTERS causes the translation of characters in the addressed local storage subspace to the character set or pairs as listed in the table of FIG. 2. The result is transferred as an operand to the appropriate destination. WRITE CHARACTERS causes the translation of an operand in the input queue from a character pair representation to a character representation. The result is written into the addressed local storage subspace.

The 2 field description operators will now be described. MADE FIELD DESCRIPTION creates a field description from the addressed local storage subspace by copying the parentheses or brackets and outer-contents and replacing the inner-contents of the structure with the count representing the number of characters in the inner-contents. The resulting field description is transferred to the appropriate destination, MAKE STRUCTURE creates a structure from the addressed local storage subspace which contains a field description. The resulting structure is transferred to the appropriate destination. The other monadic operators are the MARK operator which causes a transfer of the contents of the local storage address register to an appropriate destination; the RESET operation which resets the presence bits in the addressed local storage subspace in any of the presence bits or a 1. Otherwise, the rest bit is set; and the NOOP operator which causes no operation to be initiated. There are seven operand modifier operators which respectively set the first bit of the operand to one or zero, complement the first bit of the operand, catenate a zero or a one to the least significant end of the unsigned operand, delete the least significant bit of the unsigned operand, and the logical complement.

The dyadic operators perform the normal arithmetic and logical operations. The accumulate dyadic operators are a variance of some of the normal dyadic operators. The accumulate operator causes a result to be sent to the appropriate destination address and also to the operand field in the local storage. The index dyadic operators are identical to the accumulate dyadic operators except that no destination addresses are provided. The "zap" dyadic operators are variance of the normal dyadic operators and are employed where a dyadic type operation is desired to be performed on a field other than an operand.

THE EPILOGUE

As has been described above, the system and method of the present invention employ a network of processing or function modules and local storage units associated with each of the function modules. Execution by the function modules is initiated by the presence of all of the required data structures, one of which normally resides in the local storage and contains an operator, the other data structure being received by the function module and including an argument and an address pointing to the local storage location at which the associated data structure resides. In this manner, a series of instructions constituting a procedure, program, or task can be distributed throughout the network to increase processing performance by accommodating concurrent processes. Furthermore, data fields can be operated upon as they are transferred from function module to function module to achieve a pipelining effect dependent only upon the rate of transfer between function modules. Data transfer is serial-by-character and is synchronous within the function modules but asynchronous between function modules. The various local storage units can differ in nature, capacity, and access times so as to accommodate different processing requirements. The local storage units normally are periodic in nature and may include disc pack units, disc file units, delay line memories, charge coupled devices, and bubble memories. The local storage units may be random access memories when such is advantageous.

The system can be expanded from a single function module and associated local storage to any number of such function modules and local storage units which are accommodated by a nested network of exchanges. In this manner, a family of systems can be created to provide a spectrum of processing capabilities ranging from that of a very small system to a very large system. However, the basic unit of which such systems are formed would be uniform such that different circuits and architectural designs would not have to be created.

While only certain embodiments of the present invention have been described, it will be apparent to those skilled in the art that various changes and modifications may be made therein without departing from the spirit and scope of the invention as claimed.

What is claimed is:

1. A data driven information processing system for handling variable length data segments some of which contain an operator code but are devoid of a sufficient number of operands required for the specified operation, some of said data segments not containing an operator code but containing at least one operand which requires subsequent fetching of an operator code in order to process said at least one operand, said system comprising:

a plurality of programmable units;

means interconnecting said programmable units for serial data transfer therebetween of different variable length data segments, each of said variable length data segments being preceded by a character indicating segment beginning, each segment being followed by a character indicating segment ending; and a plurality of storage units, one for each programmable unit, each storage unit being coupled to its respective programmable unit for serial data transfer of at least one of said variable length data segments which contains an operator code but not a sufficient number of operands;

each of said programmable units including an input buffer means coupled to said interconnecting means to receive a said variable length data segment from another programmable unit, a segment beginning character detection means and a segment ending character detection means, each detection means being coupled to said input buffer means to determine the beginning and ending of the serial transfer of said data segments;

each programmable unit further including a logic unit to perform operations on different data segments, said input means coupling said interconnection means to said logic unit to transfer said different data segments to said logic unit, and a control unit coupled to said input buffer means and said respectively coupled storage unit to access said storage unit to fetch an operator code in response to the receipt of a said data segment from said interconnection means, which said data segment contains only at least one operand and thus requires said fetching of said operator code.

2. An information processing system according to claim 1 including:
a peripheral source of other data segments where one of said programmable units is coupled to said peripheral source to control data transfer there between.

3. An information processing system according to claim 1 wherein:
each control unit of said programmable units includes a control memory in which control signals are stored for subsequent transfer to said logic unit to implement said operator code.

4. An information processing system according to claim 1 including:
a programmable unit separate from said plurality of programmable units and having an input means and an output means; and
a second exchange coupled to said separate programmable unit to selectively connect the output means of said separate programmable unit to the input means of said separate programmable unit;
said second exchange being selectively coupled to said an exchange for data transfer between said separate programmable unit and one of said plurality of programmable units.

5. An information processing system according to claim 4 including:
an exchange interface unit coupled between said an exchange and said second exchange to buffer data transfer therebetween.

6. An information processing system comprising:
a plurality of programmable units having input means and output means;
a first exchange interconnecting said plurality of programmable units to selectively couple any one of said output means to any one of said input means;
a programmable unit separate from said plurality of programmable units and having an input means and an output means; and
a second exchange coupled to said separate programmable unit to selectively connect the output means of said separate programmable unit to said input means of said separate programmable unit;
said second exchange being selectively coupled to said first exchange for data transfer between said separate programmable unit and one of said plurality of programmable units.

7. A system according to claim 6 including:
a second programmable unit separate from said plurality of programmable units and having input means and output means; and
a third exchange coupled to said second separate programmable unit to selectively connect the output means of said second separate programmable unit to the input means thereof;
said third exchange being selectively coupled to said second exchange for data transfer between said second separate programmable unit and another programmable unit in said system.

8. In a data driven information processing system for handling data segments some of which contain an operator code but are devoid of a sufficient number of operands required for the specified operation, some of said data segments not containing an operator code but containing at least one operand which requires subsequent fetching of an operator code in order to process said at least one operand, said system including a plurality of programmable units each including a logic unit, a plurality of storage units each of which is coupled to a respective programmable unit to contain one or more data segments, stored therein, which data segments contain an operator code, and an interconnecting means interconnecting programmable units for data transfer therebetween, the method comprising:
receiving a data segment, containing only at least one operand, in one of said programmable units from said interconnecting means;
accessing the respective storage unit coupled to said one of said programmable units in response to said received data segment to fetch an operator code from said storage unit; and
signaling said logic unit of said one of said programmable units in response to said fetched operator code to perform an operation on said received data segment.

9. A method according to claim 8 further including:
transferring a data segment containing only at least one operand from said one of said programmable units to another of said programmable units for an operation to be performed thereon; and
transferring a second data segment containing only at least one operand to a second one of said programmable units for an operation to be performed thereon concurrent with the operation performed by said another of said programmable units.

10. A method according to claim 8 further including:
transferring said operated on data segment from said one of said programmable units to a second programmable unit for a second operation to be performed thereon after said an operation has been performed on said data segment by said one of said programmable units.

* * * * *

UNITED STATES PATENT OFFICE
CERTIFICATE OF CORRECTION

Patent No. 3,978,452          Dated   August 31, 1976

Inventor(s) Robert S. Barton et al.

It is certified that error appears in the above-identified patent and that said Letters Patent are hereby corrected as shown below:

Col. 1, line 11, change "447034" to read --447,034--.
Col. 3, line 55, change "interrupt resolution" to read --interrupt priority resolution--.
Col. 4, line 64, change "its won local" to read --its own local--.
Col. 6, line 8, change "To accommodate date" to read --To accommodate data--.
Col. 6, line 9, change "device" to read --devices--.
Col. 6, line 11, change "occurring control or" to read --occurring under control of--.
Col. 17, line 23, change "MADE FIELD DESCRIPTION" to read --MAKE FIELD DESCRIPTION--.
Col. 17, line 39, change "rest bit is set;" to read --reset bit is set;--.

Signed and Sealed this

Thirtieth Day of November 1976

[SEAL]

Attest:

RUTH C. MASON
*Attesting Officer*

C. MARSHALL DANN
*Commissioner of Patents and Trademarks*